United States Patent [19]
Foti

[11] Patent Number: 6,092,274
[45] Date of Patent: Jul. 25, 2000

[54] METAL HOSE FITTING AND METHOD OF MAKING

[75] Inventor: Sam J. Foti, Lyndhurst, Ohio

[73] Assignee: 40 Properties Management, LTD, Cleveland, Ohio

[21] Appl. No.: 09/031,459

[22] Filed: Feb. 26, 1998

[51] Int. Cl.[7] .................................................. B21D 39/00
[52] U.S. Cl. ........................... 29/520; 285/903; 285/256; 285/382
[58] Field of Search .................................... 285/903, 256, 285/382; 29/520

[56] References Cited

U.S. PATENT DOCUMENTS

| | | |
|---|---|---|
| 2,309,719 | 2/1943 | Vaill ..................................... 285/256 X |
| 2,323,912 | 7/1943 | Johnson . |
| 2,583,956 | 1/1952 | Lindsay et al. . |
| 2,848,254 | 8/1958 | Millar ................................... 285/256 X |
| 3,023,496 | 3/1962 | Millar . |
| 3,673,547 | 6/1972 | Ziegler, Jr. . |
| 4,257,155 | 3/1981 | Hunter . |
| 4,400,022 | 8/1983 | Wright . |
| 4,437,691 | 3/1984 | Laney ................................... 285/903 X |
| 4,542,922 | 9/1985 | Grossauer . |
| 4,630,850 | 12/1986 | Saka . |
| 4,671,542 | 6/1987 | Junchnowski . |
| 5,080,405 | 1/1992 | Sasa et al. . |
| 5,131,696 | 7/1992 | Sykes et al. . |
| 5,219,186 | 6/1993 | Hosseinian et al. . |
| 5,404,632 | 4/1995 | Zaborski . |
| 5,499,439 | 3/1996 | Zaborszki et al. . |
| 5,511,720 | 4/1996 | Zaborszki et al. . |

*Primary Examiner*—Terry Lee Melius
*Assistant Examiner*—David E. Bochna
*Attorney, Agent, or Firm*—Watts Hoffmann Fisher & Heinke

[57] ABSTRACT

A metal hose comprises a metal tube having an annularly corrugated wall, a fitting body, an extension that projects from the fitting body, and a sealing member. The fitting body defines a sealing seat for the sealing member. The extension projects from the body about the tube and defines a corrugation positioner distal the fitting body. The extension is deformed to shift the corrugation positioner toward engagement with the tube and resiliently compress the tube corrugations between the positioner and the sealing member. The resiliently compressed corrugations urge the sealing member against the seat for sealing the juncture of the fitting and the tube. In one embodiment a reinforcing shroud surrounds the tube and extends into the fitting. The fitting secures the shroud in place. The corrugation positioner compresses the tube corrugations through the shroud so the shroud is clamped and secured in place by the positioner at a location spaced axially from its end within the fitting.

4 Claims, 2 Drawing Sheets

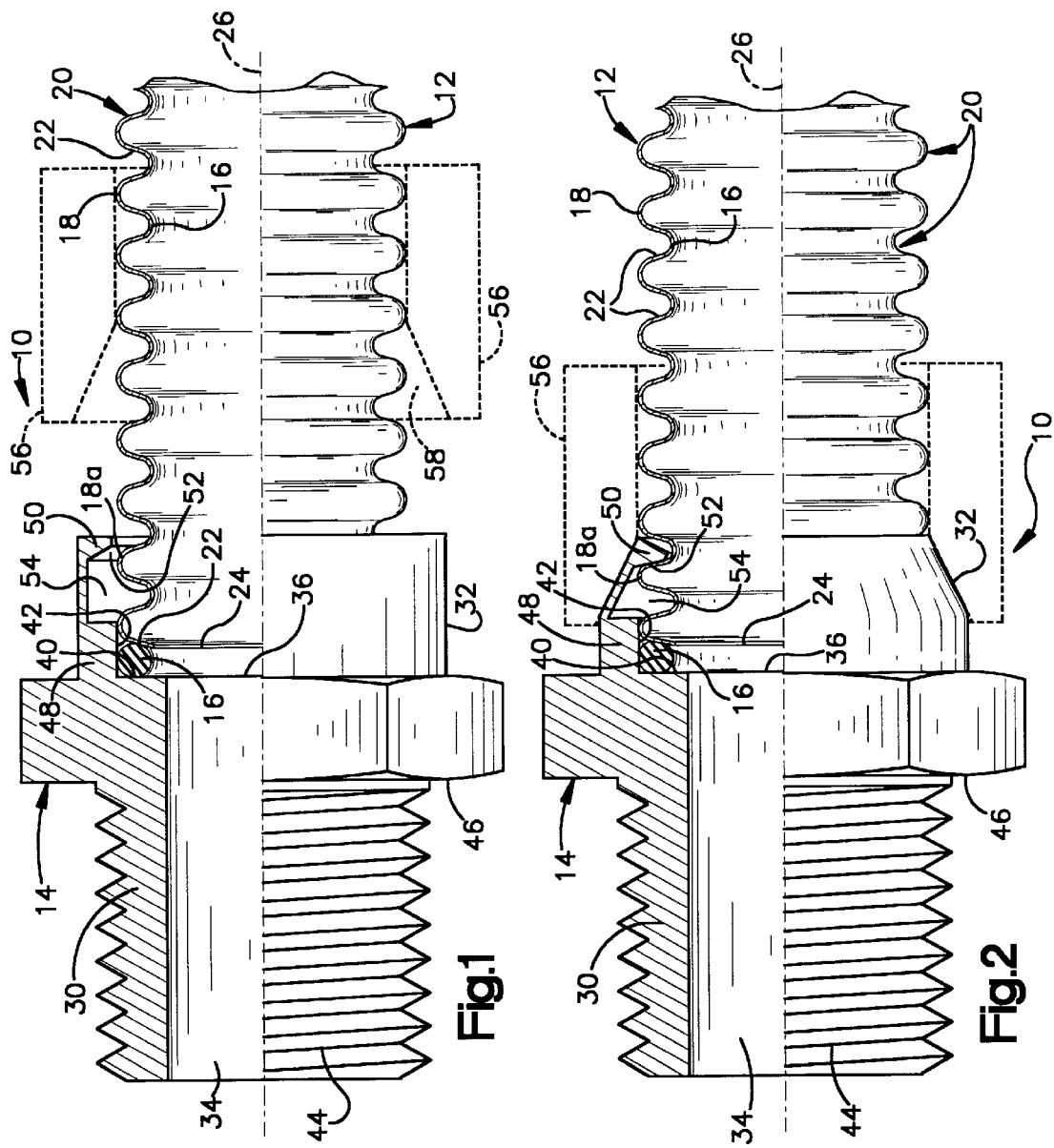

METAL HOSE FITTING AND METHOD OF MAKING

FIELD OF THE INVENTION

The present invention relates to metal hose fittings and more particularly to fittings that are assembled at the ends of hoses with the juncture of the hose and fitting sealed against leakage of pressurized fluid from within the hose.

BACKGROUND OF THE INVENTION

Constructing hose end fittings where the juncture of the hose and fitting does not leak when subjected to high internal hose pressure has been a perennial problem. In the case of metal hoses, various different approaches have been taken. Some fittings have been welded or brazed onto the metal hose. Constructing these kinds of fittings required specialized equipment and skilled operators.

When hoses have been constructed from annularly corrugated tubes, fittings formed from members that are screwed together to crush interposed tube corrugations were frequently employed. Usually the corrugations were crushed against a sealing face formed on one fitting member. Sealing material was sometimes applied where the crushed corrugations were seated to block leakage paths. In other hoses, seal rings were associated with the sealing faces so that the corrugations were crushed against the seal ring.

Although these fitting constructions were relatively easily assembled to corrugated tubes without requiring sophisticated tools or machinery, the hose performance was not optimal. Leakage occurred after repeated usage. Hose flexures and repeated internal hose pressure cycling caused leakage paths to develop.

The present invention provides a new and improved metal hose and method of making the hose wherein the hose and end fitting are assembled without the need of specialized equipment or skilled labor and the juncture of the end fitting and hose is resiliently sealed against leakage of pressurized fluid from within the hose and resists such leakage after long usage of the hose.

SUMMARY OF THE INVENTION

A new and improved metal hose constructed according to a preferred embodiment of the invention comprises a metal tube having a corrugated wall with successive corrugations defining inner and outer peaks joined by imperforate wall sections and terminating adjacent a peak, a fitting body, an extension that projects from the fitting body, and a sealing member. The fitting body has a through opening and a seal seat that surrounds the through opening and defines a sealing surface extending outwardly from the through opening. The sealing surface has an outer peripheral shape that conforms to the outer peripheral shape of the tube cross section. The sealing member is shaped to conform to the sealing surface and to the tube end and is engaged with and between the seat and the tube end. The extension defines a tube corrugation positioner distal the fitting body and is deformed to shift the corrugation positioner toward engagement with the tube just beyond a corrugation peak. The corrugation positioner resiliently compresses at least a tube corrugation and the seal member between the corrugation positioner and the sealing surface.

The invent on also provides a new and improved method of constructing a hose comprising the steps of: constructing a metal tube having a corrugated wall with successive corrugations defining inner and outer peaks joined by imperforate wall sections; terminating the tube adjacent a corrugation peak; fabricating a tube end fitting body having a through opening and a seal seat that surrounds the through opening and has a sealing surface that extends outwardly from the through opening and an outer peripheral shape that conforms to the outer peripheral shape of the tube cross section; forming an extension that projects from the fitting body and defines a tube corrugation positioner distal the fitting body; assembling a sealing member to the fitting body in contact with the sealing surface and placing the fitting body on the terminated tube end with the terminated end engaging the sealing member and the tube corrugation positioner located at least one corrugation peak from the seal member; deforming the extension so that the corrugation positioner moves toward engagement with the tube just beyond the at least one corrugation peak; and, resiliently compressing the tube corrugations and the seal member between the corrugation positioner and the sealing surface while deforming the extension.

In one preferred embodiment of the invention the extension is formed by a tubular wall that extends along the tube exterior. The projecting end of the extension is upset, or inelastically deformed, so that the corrugation positioner is moved inwardly into engagement with the tube.

In some circumstances, the hose may be equipped with a shroud to reinforce the hose against internal pressures. The new fitting not only seals the juncture of the fitting and the tube but also secures the shroud in place. In such a hose, the extension is constructed to extend along the exterior of both the tube and shroud. The extension is deformed to move the corrugation positioner and apply compressing force against the tube corrugation through the shroud. The corrugation in turn resiliently urges the seal into engagement with the sealing seat while the shroud is clamped and secured in place by the positioner at a location spaced axially from its end within the fitting.

Additional features and advantages of the invention will become apparent from the following detailed description of preferred embodiments and from the accompanying drawings which form part of the specification and in which:

BRIEF DESCRIPTION OF THE DRAWINGS

FIG. 1 is a fragmentary cross sectional view of a hose constructed according to the present invention at one stage during its fabrication;

FIG. 2 is a fragmentary cross sectional view showing the hose of FIG. 1 at another stage of its fabrication;

DESCRIPTION OF THE BEST MODES CONTEMPLATED FOR PRACTICING THE INVENTION

Figure 3:
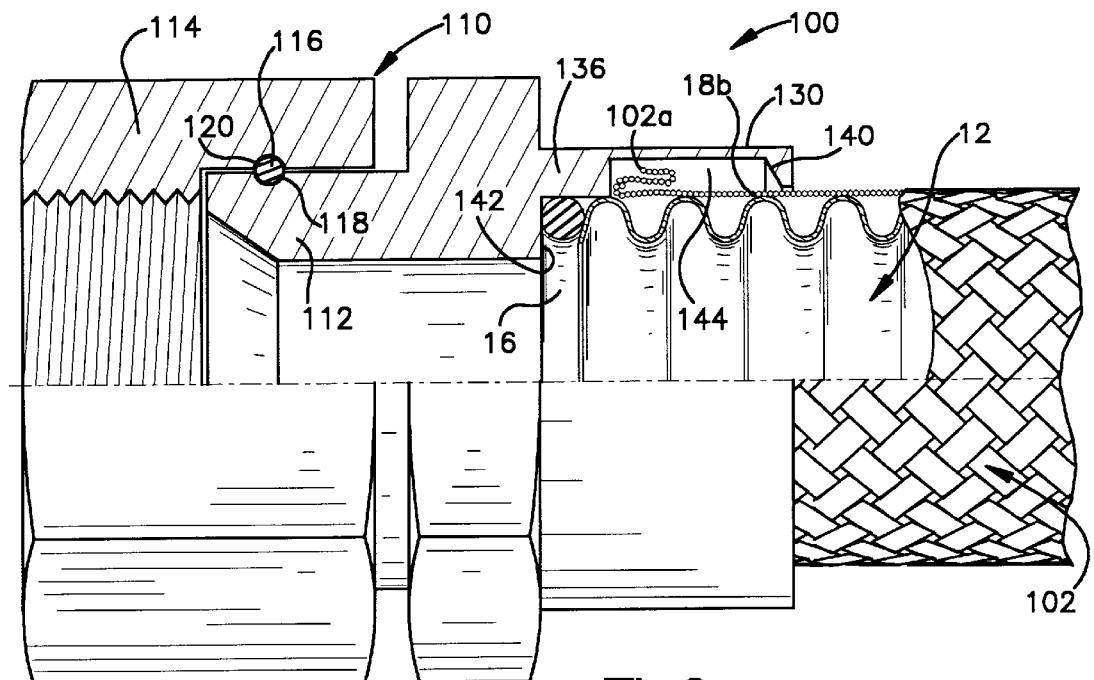
FIG. 3 is a fragmentary cross sectional view of a modified hose constructed according to the invention at one stage of its fabrication; and, FIG. 4 is a fragmentary cross sectional view showing the hose of FIG. 3 at another stage of its fabrication.

A hose 10 constructed according to the invention is partially illustrated in FIGS. 1 and 2. The hose 10 is illustrated as a flexible metal hose that is intended for use in handling pressurized fluent materials. The hose 10 comprises a corrugated metal tube 12, a fitting 14 at the end of the tube and a sealing member 16 for sealing the juncture of the fitting and tube against leakage of high pressure fluid form within the hose.

The tube 12 has a relatively thin, corrugated wall defining successive corrugations 20 each formed by an inner peak 16 or an outer peak 18. The peaks are joined by imperforate wall sections 20 extending between them. The tube 12 is terminated by cutting it along a wall section 22 near a corrugation peak. In the illustrated and preferred hose 10 the tube is terminated adjacent an inner peak 16 so that the terminal wall section 22 extends inwardly and axially to its edge 24. The preferred tube 12 is annularly corrugated—meaning that each corrugation extends about the tube in a plane that is normal to the tube axis 26 and parallel to the adjacent corrugations—and circular in cross section. The tube 12 may be formed from any suitable metal, for example stainless steel, and in any well known manner, such as by "hydro forming" a continuous tube or by hermetically bonding a series of prefabricated corrugations together.

The fitting 14 forms the end of the hose 10 and is attached to the tube 12. The fitting 14 is so constructed and arranged that it may be connected to a hose coupling, a nozzle, a pipe or any other fluid handling device for delivering fluid to or from the hose. The fitting 14 comprises a fitting body 30 at the end of the tube 12 and an extension 32 that projects from the fitting body in the direction of the tube axis 26. The fitting body 30 defines a through opening 34 and a seal seat 36 that surrounds the through opening and confronts the tube end 24. The through opening 34 is generally aligned with the tube axis 26. The seal seat 36 defines a sealing surface 40 extending radially outwardly relative to the through opening. The sealing surface has an outer peripheral shape that conforms to the outer peripheral shape of the tube cross section. In the illustrated fitting 14 the seal seat 36 also defines a secondary sealing surface 42 that extends axially from the outer periphery of the sealing surface 40 in the direction of the tube 12. The cross sectional shape of the surface 42 conforms to the cross sectional shape of the tube 12 and is spaced just radially outwardly from the radially outer tube peaks 18. The illustrated sealing surface 40 has a circular peripheral shape and the sealing surface 42 has a circular cross sectional shape, so that both conform to the cross sectional shape of the tube 12.

In the hose illustrated in FIGS. 1 and 2 the fitting body 30 is shown as having an externally threaded nipple section 44 projecting away from the tube 12 and a radially outwardly projecting section 46 that defines external wrench flats for facilitating screwing the nipple section to a receiving member. The body 30 may be formed in any other suitable or desirable configuration. In addition, the fitting body 30 illustrated in FIGS. 1 and 2 is so constructed and arranged that the sealing surface 42 forms the radially inner side of a collar-like fitting body projection 48 extending axially from the section 46.

The sealing member 16 is disposed between the fitting 14 and the tube 12 and is urged against the sealing surface 40 by the tube 12 when the fitting and tube are assembled. The preferred sealing member is a continuous resilient member that surrounds the through opening 34. The sealing member periphery is shaped to conform to the surface 40 and the tube 12 cross sectional shape. Thus, in the preferred hose the sealing member is a toroidal O-ring formed from a stiffly resilient plastic material.

The illustrated and preferred seal member 16 is urged into sealing engagement with both the primary sealing surface 40 and the secondary sealing surface 42. The tube 12 is severed adjacent a radially inner peak 16 so that the terminal tube wall section 22 that engages the seal member extends axially toward the body 30 and radially inwardly. The resultant force applied to the sealing ring by the wall section 22 urges the sealing ring axially into engagement with the sealing surface 40 and radially outwardly into engagement with the surface 42.

The wall section 22 sealingly engages the sealing member 16. The confronting surfaces of the wall section 22 and the seal member are smooth and make contact over a relatively wide area. The resilient force applied by the tube assures that the juncture of the engaged surfaces blocks leakage of fluid from within the hose between the tube end and the seal member when internal hose pressures are low. When the hose contains fluid at pressures that are great compared to the pressure ambient the hose, the differential pressure force applied to the sealing member and the terminal tube wall section 22 increases the engagement force between the wall section 22 and the sealing member in relation to the magnitude of the differential pressure.

The extension 32 is deformed to fix the fitting 14 to the tube 12. The extension defines a tube corrugation positioner 50 distal the fitting body 30. The extension 32 is deformed to shift the corrugation positioner 50 toward engagement with the tube 12 just beyond a corrugation peak. The corrugation positioner 50 resiliently compresses at least one tube corrugation and the seal member between the corrugation positioner and the sealing surface. In the embodiment illustrated by FIGS. 1 and 2 the positioner 50 is initially stationed radially outwardly from the outer peaks 18 so the fitting 14 can be installed on the tube end without interference. The positioner shifts radially inwardly toward engagement with the adjacent tube peak 18a and, as the shifting movement continues, cams the peak 18a toward the seal seat 36. Both the tube 12 between the positioner and the seal seat, and the sealing member 16 itself, are resiliently compressed as the positioner moves. Alternatively, where practical, the tube and sealing member may be compressed and maintained in position while the extension is deformed so that the positioner engages and positions the tube when the compressive force is relieved.

In the hose illustrated by FIGS. 1 and 2, the extension 32 is upset, or inelastically deformed, so that the fitting 14 is effectively "permanently" fixed to the tube. The fitting, seal member and tube are assembled to the condition illustrated by FIG. 1 and the extension is deformed to secure the fitting and tube together. In the preferred embodiment a swaging tool 56 (schematically illustrated by broken lines) defining a frustoconical female die cavity 58 is disposed about the tube 12. The fitting and die are forced together—for example by the use of an arbor press—so that the extension 32 is forced into the die and inelastically deformed into the generally frustoconical shape illustrated in FIG. 2. The extension deformation takes place all along the extension from a location adjacent the juncture of the extension 32 and the collar 48. The collar radial wall is sufficiently that the collar configuration remains unchanged by the swaging operation.

The preferred extension 32 is formed by a tubular, substantially continuous wall disposed about said tube cylindrical element that projects from the fitting body about the tube 12. The illustrated extension is cylindrical. The illustrated positioner 50 extends radially inwardly toward the tube 12 and defines a smooth camming, or wedging, surface 52 that faces axially toward the seal seat and radially inwardly before the extension 32 is deformed (FIG. 1) and extends generally radially after the fitting and tube are secured together (see FIG. 2). The camming surface 52 applies a compressive force to the tube. The illustrated positioner is formed by a flange that extends continuously about the extension distal the fitting body.

In the preferred embodiment of the invention the extension 32 is continuous with and projects from the collar 48. The extension 32 has a relatively thin wall section compared to the collar 48 so that a clearance space 54 extends about the tube end region between the positioner 50 and the collar 48. The compressed tube corrugations not only have a lesser "pitch"—or axial dimension measured from peak to peak— compared to the uncompressed corrugations, but are also deeper than the uncompressed corrugations. The clearance space 54 accommodates the radial expansion of the compressed corrugations.

Figure 4:
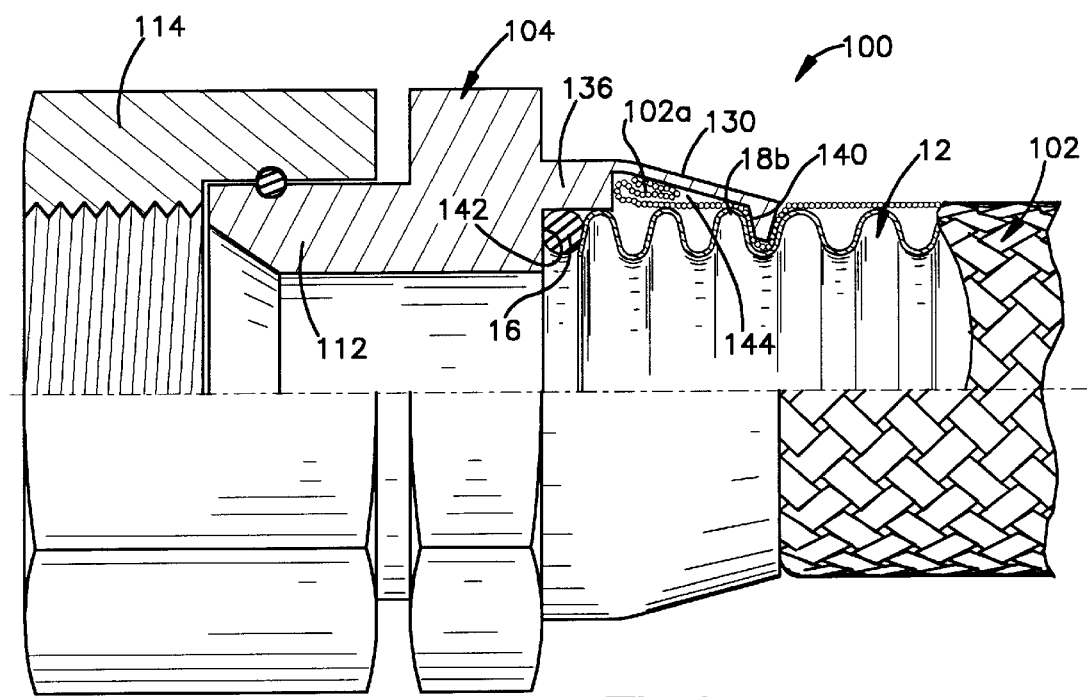

FIGS. 3 and 4 illustrate a modification of the hose featured by FIGS. 1 and 2 wherein elements and components that are identical to elements and components of FIGS. 1 and 2 are indicated by like reference characters. In the embodiment of FIGS. 3 and 4 the hose 100 comprises a corrugated metal tube 12, a reinforcing shroud 102 fitted about the tube, a fitting 104 at the end of the tube, and a sealing member 16 for sealing the juncture of the fitting and tube against leakage of high pressure fluid form within the hose. The illustrated tube 12 and sealing member 16 are constructed the same as the tube and sealing member of FIGS. 1 and 2.

The reinforcing shroud 102 surrounds and reinforces the tube 12 against forces resulting from internal pressure levels that far exceed the pressure ambient the hose. Opposite ends of the shroud are disposed near the ends of the tube. The shroud end 102a is disposed within the hose end fitting 104. The shroud may be of any suitable or conventional construction—the illustrated shroud 102 is formed from braided fine metal wires—and therefore is not described in detail.

The fitting 104 differs from the fitting 14 in that the fitting end projecting away from the tube 12 forms a swivel coupling. The fitting body 110 has a radially outwardly extending portion forming wrench flats like the portion 46 and an axially extending smooth, cylindrical nipple portion 112. An internally threaded coupling element 114 is rotatably mounted on the nipple portion 112. The element 114 is formed with external wrench flats that enable the element to be screwed to some other externally threaded component. The nipple portion 112 and the element 114 are formed with circumferentially extending alignable grooves 116, 118 that receive a sealing ring 120. The grooves 116, 118 have smooth arcuately curved cross sections that sealingly receive that ring 120. The ring 120 may be a conventional O-ring that seals the juncture of the nipple portion 112 and the element 114. While a swivel coupling is illustrated and described, it is to be understood that any conventional or suitable construction can be employed as the fitting end projection away from the tube.

The fitting 104 not only seals the juncture of the fitting and the tube 12 but also secures the shroud 102 in place. In such a hose, the fitting extension 130 is constructed to extend along the exterior of both the tube 12 and shroud 102. The extension 130 is deformed radially inwardly from a location near the collar 136 so that the corrugation positioner 140 shifts toward that tube corrugation peak 18b. The positioner 140 applies axial compressing force against the tube corrugation through the shroud 102. The corrugation in turn resiliently urges the sealing member 16 into engagement with the sealing seat 142 while the shroud 102 is clamped and secured in place by the positioner 140 all around the tube periphery at a location spaced axially from the shroud end within the fitting. In the illustrated embodiment the extension 130 is upset and permanently deformed by a swaging operation.

After the swaging operation the compressed corrugations are deepened relative to the uncompressed corrugations and the shroud end between the positioner and the collar 136 tends to become bunched. This is particularly true of shrouds constructed from fine wire braiding because they are difficult to cut off cleanly and present ragged, or uneven, ends. The fitting 104 is constructed and arranged to accommodate the compressed corrugations and the shroud end after the fitting and tube are assembled together. The fitting 104 differs from the fitting 14 in that the extension 130 of the fitting 104 is relatively longer axially than the extension 32 illustrated in FIGS. 1 and 2. The illustrated extension 102 projects a distance equal to one additional radially outer corrugation 18 farther along the tube than the extension 32. Accordingly, the clearance space 144 between the positioner and the collar is larger than the clearance space 54 and accommodates the compressed corrugations and the shroud.

While two embodiments of the invention have been illustrated and described in considerable detail, the invention is not to be considered limited to the precise constructions disclosed. Various adaptations, modifications, and uses of the invention may occur to those skilled in the business to which the invention relates. For example, the fittings can be constructed using various different schemes for coupling the fitting to other hoses, valves, and so forth. Different kinds of sealing rings can be used that exhibit different chemical properties and have differing degrees of resiliency, depending on the usage of the hose. The intention is to cover all such adaptations, modifications, and uses coming within the spirit or scope of the appended claims.

Having described my invention I claim:

1. A method of fabricating a hose end comprising:
   a. constructing a metal tube having a corrugated wall with successive corrugations defining inner and outer peaks joined by imperforate wall sections;
   b. terminating the tube adjacent a corrugation peak;
   c. fabricating a tube end fitting body having a through opening and a seal seat that surrounds the through opening and has a sealing surface that extends outwardly relative to the through opening;
   d. forming a fitting body extension that projects from the sealing surface and defines a tube corrugation positioner distal the sealing surface;
   e. assembling a sealing member to the fitting body in contact with the sealing surface and placing the fitting body on the terminated tube end with the terminated end engaging the sealing member and the tube corrugation positioner located at least one corrugation peak from the seal member;
   f. deforming the extension so that the corrugation positioner moves toward engagement with the tube just beyond said at least one corrugation peak; and,
   g. resiliently compressing the tube corrugations and the seal member between the corrugation positioner and the sealing surface while deforming the extension.

2. The method claimed in claim 1 wherein deforming the extension comprises inelastically deforming the extension so that the fitting body is fixed to the tube.

3. The method claimed in claim 1 further comprising placing a shroud on said tube that has an end adjacent the tube termination and wherein deforming the extension comprises moving the positioner into engagement with said shroud while compressing the tube corrugations and clamping the shroud to the tube to anchor the shroud on the tube.

4. The method claimed in claim 1 wherein forming said extension comprises sizing the extension to extend radially outwardly about the tube.

* * * * *